United States Patent [19]

Grube et al.

[11] Patent Number: 5,113,998
[45] Date of Patent: May 19, 1992

[54] HANGING DEVICE FOR SUPPORTING A CLOTHES-HANGER ON A SUSPENDED CONVEYOR

[75] Inventors: Erwin Grube, Bielefeld; Walter Kuhlmann, Lage; Ralf Schneuing, Horstel, all of Fed. Rep. of Germany

[73] Assignee: Dürkopp Adler AG, Fed. Rep. of Germany

[21] Appl. No.: 494,125

[22] Filed: Mar. 15, 1990

[30] Foreign Application Priority Data

Mar. 18, 1989 [DE] Fed. Rep. of Germany ....... 3909002

[51] Int. Cl.$^5$ .............................................. B65G 47/34
[52] U.S. Cl. .................................. 198/465.4; 198/680
[58] Field of Search ...................... 198/360, 680, 465.4

[56] References Cited

U.S. PATENT DOCUMENTS

| | | | |
|---|---|---|---|
| 859,986 | 7/1907 | Smith | 198/680 |
| 1,556,723 | 10/1925 | Shaffer | 198/680 |
| 2,644,407 | 7/1953 | McCormick | 198/680 X |
| 2,796,165 | 6/1957 | Carr | 198/465.4 |
| 3,151,730 | 10/1964 | Bunten | 198/680 X |
| 3,163,283 | 12/1964 | Kuwertz | 198/680 X |
| 3,422,950 | 1/1969 | Bachmann | 198/680 |
| 4,856,144 | 8/1989 | de Greef | 198/465.4 X |
| 4,909,373 | 3/1990 | Geerts | 198/465.4 X |

FOREIGN PATENT DOCUMENTS

| | | | |
|---|---|---|---|
| 157640 | 6/1952 | Australia | 198/680 |
| 1873579 | 6/1963 | Fed. Rep. of Germany . | |
| 2158744 | 7/1972 | Fed. Rep. of Germany . | |
| 381581 | 9/1973 | U.S.S.R. | 198/680 |
| 0829492 | 5/1981 | U.S.S.R. | 198/680 |
| 0865748 | 9/1981 | U.S.S.R. | 198/680 |
| 1482519 | 8/1977 | United Kingdom | 198/465.4 |

Primary Examiner—D. Glenn Dayoan
Attorney, Agent, or Firm—Ostrolenk, Faber, Gerb & Soffen

[57] ABSTRACT

The present invention relates to a hanging device for supporting a hanger on a suspended conveyor, on which articles of clothing may be hung. The hanging device includes a base body; a flap which is pivotally mounted on the base body for pivoting about an axis perpendicular to the direction of transport; the flap having an open position and a closed position; and an arrangement for locating the hook of the clothes hanger on a portion of the base body, resting against the flap, with the flap in its closed position. These and other features of the hanging device provide dependable loading, transport and delivery of the clothes hangers under all circumstances.

24 Claims, 8 Drawing Sheets

HANGING DEVICE FOR SUPPORTING A CLOTHES-HANGER ON A SUSPENDED CONVEYOR

BACKGROUND OF THE INVENTION

1. Field of the Invention

The present invention relates to an improved hanging device for supporting a clothes-hanger on a suspended conveyor. It relates more particularly to a hanging device having an open position and a closed position, which is opened for releasing a clothes-hanger which is being carried thereon.

2. Background Art

A large number of hanging devices are conventionally fastened to the drive chain of a suspended conveyor. They serve, for instance, to receive a clothes hanger in order for the conveyor to transport an article of clothing hanging on the clothes hanger to a given place of deposit.

Ordinarily these hanging devices are moved past a loading station which is arranged alongside the conveyor path, and one by one the clothes hangers are automatically transferred into hanging devices at the loading station. At the destination for an article of clothing on a given hanger, the corresponding hanging device is opened and the clothes hanger is ejected or otherwise transferred.

For this purpose, clamp-like hanging devices are known which, in closed condition, form a resting surface for the hook of the clothes hanger and are opened at a specific position so that the clothes hanger drops down or slides onto an ejection rod.

For example, Federal Republic of Germany OS 21 58 744 discloses a hanging device which is formed by two arms which engage each other in fork-like manner and which, in closed condition, assume a V-shaped position with respect to each other so that the clothes hanger is held in the center of the two arms. One of the arms is connected to an opening lever which, at the place of ejection, passes over a nose which is formed on the conveyor line and is thereby pressed outward, as a result of which this arm swings downward to such an extent that it is aligned with the other arm and the clothes hanger can slide down on the arm which has been swung away, onto a storage rod.

Such a hanging device is expensive in construction. The delivery of a clothes hanger is possible only when the two arms are aligned with each other and the stable position of the clothes hanger is eliminated in this way, which requires exact agreement between the nose and opening lever. Furthermore, it is possible that the suspended clothes hanger will twist during transportation and thus become so tilted with respect to the arms that it no longer slides down by itself.

Hanging devices are furthermore known in which the clothes hangers are hung on a hook which is swingable in a direction opposite the direction of transport or in an upward direction. At the place of ejection, this hook is swung back by an opening lever which is connected to it, so that the clothes hanger can slide down out of the hook. Disadvantageously, if a horizontal force is applied to the suspended clothes hanger during transportation, the hanger can travel so far on the hook that the subsequent angle of opening is not sufficient to permit the hanger to slide down by itself. Similarly, the clothes hanger may also tilt in this hanging device. If a heavy article of clothing is not present on the clothes hanger, it may happen, as a result of receiving a static electric charge during transportation, that the clothes hanger remains adhered to the hook and cannot be ejected by itself.

Federal Republic of Germany U 18 73 579 discloses a hanging device having a U-shaped profiled rail for the simultaneous reception of several clothes hangers. The profiled rail is mounted in hinge-like manner on a shaft which extends in the direction of travel. To prevent the hanging device from being opened solely by the force of the hanger hook resting on the profiled rail, the hanging device also has a supporting member which must be swung away before the hanging device can open.

SUMMARY OF THE INVENTION

The object of the invention is to create an improved hanging device of the aforementioned type with which simple loading and unloading is possible and which has a high degree of reliability in operation, is simple in construction, and can be manufactured at favorable cost.

This object is achieved, for example, by a hanging device for supporting a clothes hanger on a suspended conveyor which moves in a direction of transport, comprising a base body; a flap which is pivotably mounted on the base body for pivoting about an axis which extends perpendicular to the direction of transport (T); the flap having an open position and a closed position; and means for locating the hook of the clothes hanger on a portion of the base body and resting against the flap, with the flap in its closed position.

The flap controls the loading of the clothes hanger into the hanging device, secures the hanger during transport, and permits simple delivery of the clothes hanger, and the flap is pivotally fastened on the base body By this invention, a solution which is satisfactory under all conditions has been found.

Preferably the flap should open with an initial movement in the direction of transport. For example, the flap may be angled slightly downward from its pivot point when in its closed position. Thus, the flap moves against the clothes-hanger hook when the flap begins to open and the hook is moved out of its position of rest, so that it is impossible for the hook to stick to the hanging device due to a static electric charge.

Since, the pivot point of the flap lies at a vertically higher position than the point at which the flap rests on the first bevel surface, when a force acts on the hanger opposite the direction of transport, a moment acts on the flap directed in the closing direction so that the flap cannot open.

A bevelled surface is formed on a sidewall of the base body, just in front of the flap in the direction of transport. This features assures that the clothes-hanger hook is always in a well-defined position.

This bevelled surface preferably has a rounded top surface. This reduces the friction between hanger and the hanging device.

The bevelled surface is advantageously formed by a plurality of individual first, second and third bevelled surfaces, arranged one after the other in the direction of transport. The pitch of the first bevelled surface just in front of the flap is preferably the greatest, and the pitch of the third bevelled surface at the front of the hanging device is preferably the least. Thus, the hanging device is shaped so that the hook of the clothes hanger is reliably guided into its position of transport.
}

Other features contribute to the clothes-hanger hook not tilting or jamming upon loading or during transport. For example, the resting surface, on the bevelled surface of the base body, on which the hook of the clothes hanger rests, becomes wider at the end of the bevelled surface nearer the flap. Also, advantageously the length of the bevelled surface is greater than the diameter (D) defined by the hook of the hanger which is to be received.

A shoulder is formed preferably between the individual first bevel closest to the flap and the adjoining second bevel. The height (H) of the shoulder is substantially at least as great as the diameter (d) of the wire the clothes-hanger hook is made of. This feature prevents a hanger which has once been loaded from being pushed out of the apparatus by a force which acts on it in the direction of transport.

A spring is provided for holding the flap closed. The flap opens against the force of this spring, and a closure force which must be overcome is present in the closed position. Thus the flap closes automatically, and is self-locking.

A wide forward-facing surface is provided for stripping the clothes-hanger hook off the loading mandrel and preventing it from tilting during the transfer. Accordingly, the width (B) of the resting surface (2a) of the flap which engages the clothes-hanger hook is greater than the diameter (D) of the hook to be engaged.

Other advantageous embodiments and aspects of the invention are disclosed and claimed herein.

BRIEF DESCRIPTION OF THE DRAWINGS

Other objects, features and advantages of the invention will be appreciated from the following detailed description of an embodiment thereof, with reference to the drawings, in which.

DETAILED DESCRIPTION

Figure 1:
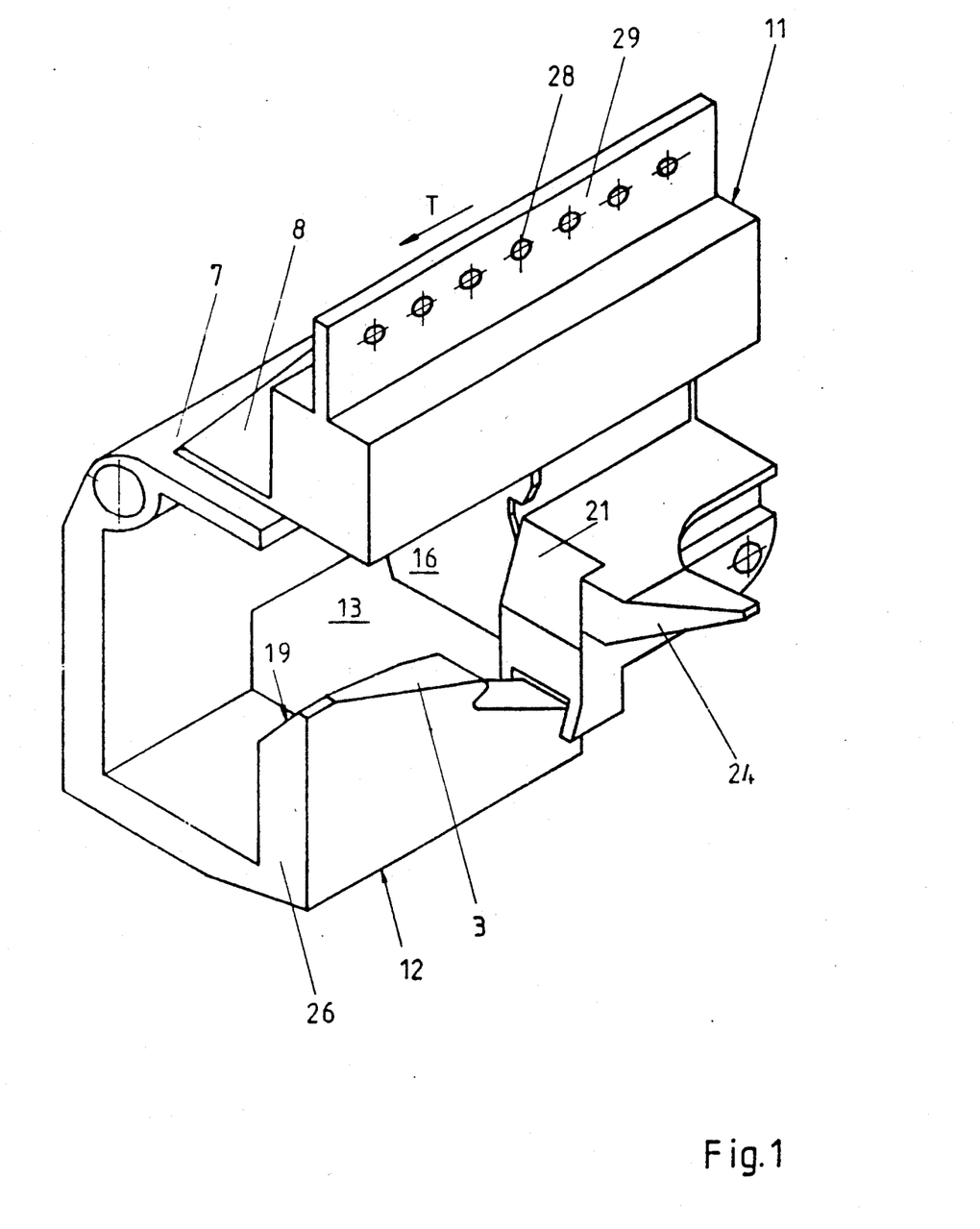
FIG. 1 is a perspective view of the hanging device according to the disclosed embodiment.

FIG. 1 shows an overall perspective view of the tripartite hanging device, shown in its closed position. In this example the hanging device may be made primarily of plastic. A flap 2 (FIG. 2) is held in closed position by a tension spring 15 (FIG. 3). The flap 2 is fastened swingably on the base body 1 via the bolt 14.

Figure 2:
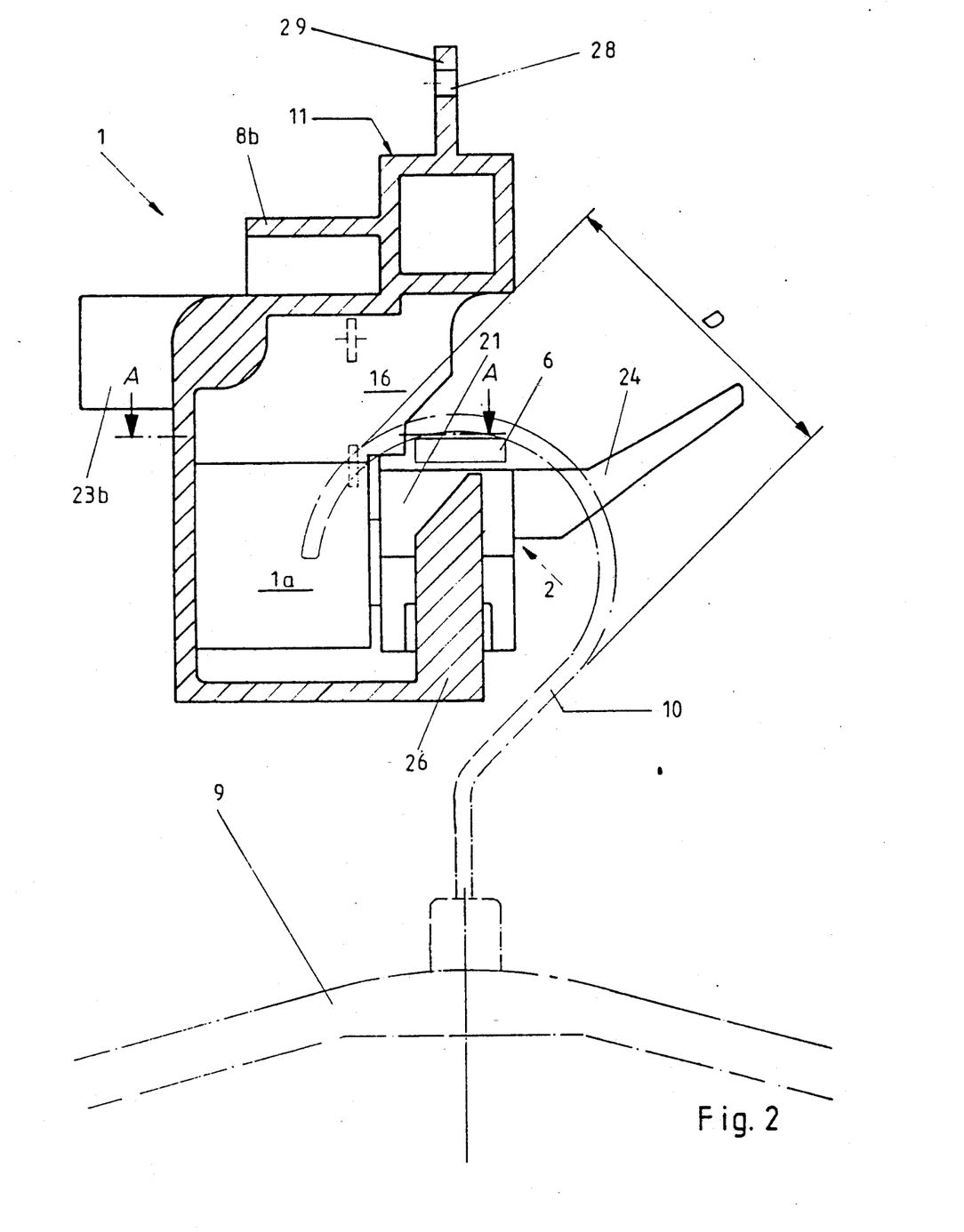
FIG. 2 is a front end view of the hanging device, partially in section, with a hanger in its loading position.
Figure 3:
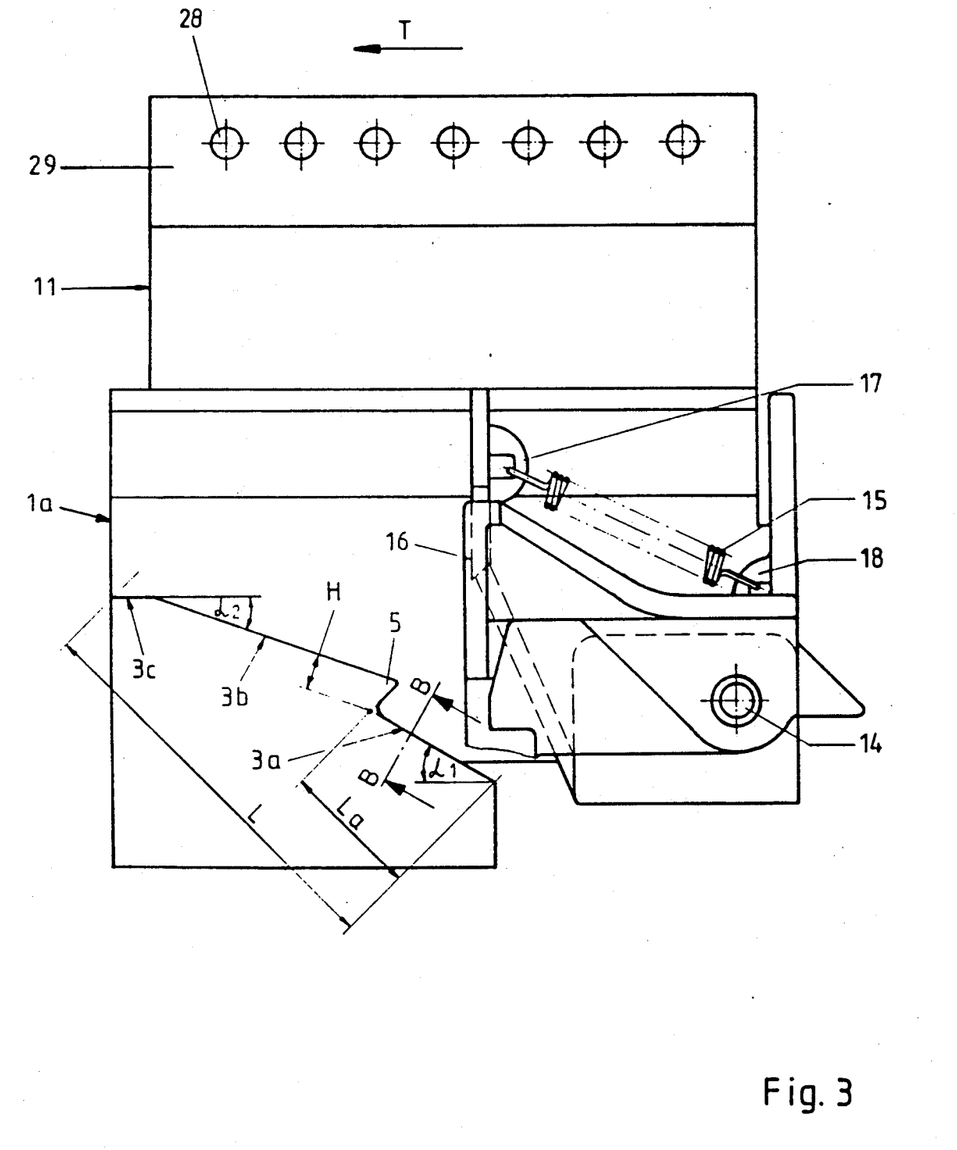
FIG. 3 is a view showing a first side of the hanging device.

As seen in cross-section in FIG. 2, the base body 1 has the shape substantially of a hollow rectangle which has a longitudinal opening on the side for receiving the hooks 10 of the clothes hangers 9 that are introduced into the hanging device. At its top, the base body 1 is provided with a flange 11 by means of which the hanging device is connected with the carrier device not shown here) which is fastened in force-locked (e.g., held by friction) or form-locked (e.g., positively engaging) manner on the drive chain of the hanger conveyor.

The expressions "front" and "rear" as used in the description are merely relative, non-limiting terms and usually refer to the direction of transport T in installed position, "front" meaning "in the direction of transport." This same applies with regard to the expressions "top" and "bottom."

The flap 2 is swingably fastened via the bolt 14 on the rear end (to the right in FIG. 3) of the base body 1. The flap 2 extends over the complete width and approximately half the length of the base body 1 and is held in its closed position by the tension spring 15. For this purpose, the one end of the tension spring 15 is pivoted to the lug 17 which is formed on the wall 16 which is provided within the cross-section of the base body 1 while its other end is pivoted to the lug 18 which is correspondingly provided on the flap 2.

Figure 5:
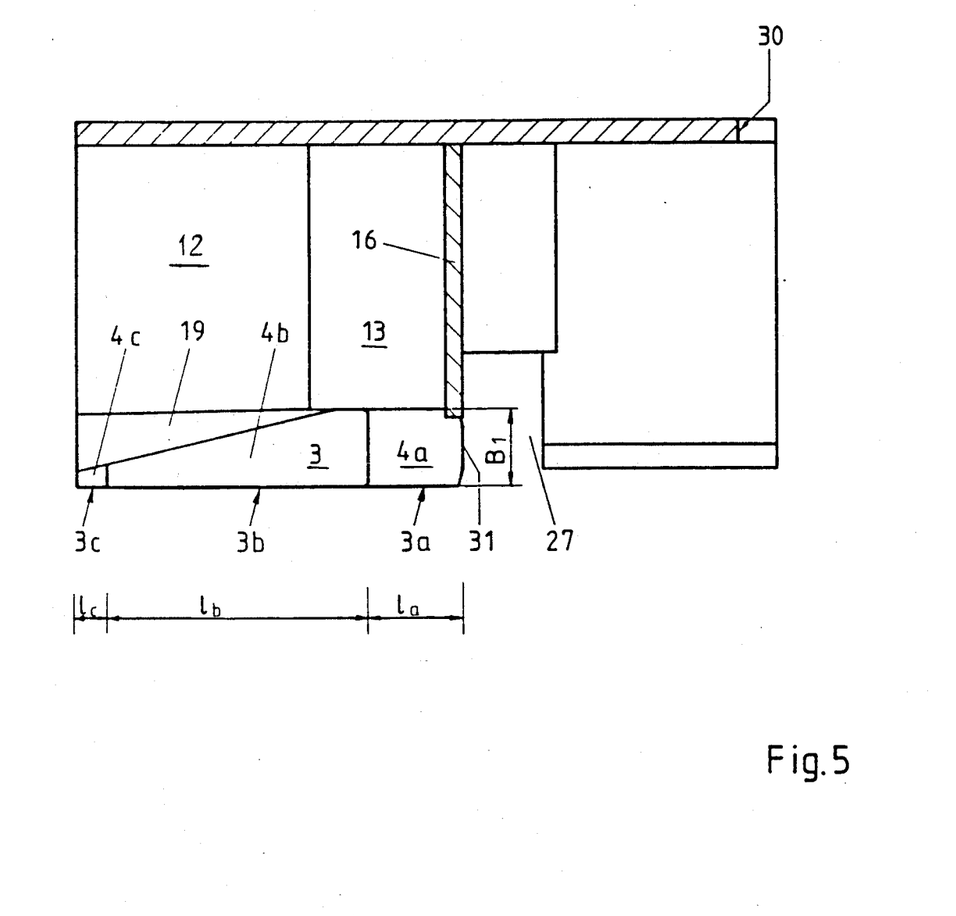
FIG. 5 is a longitudinal section through the base body, taken along the section line A—A.

A bevel 3 is formed, extending in the longitudinal direction, in front of the flap 2, on the side wall 26 of the base body 1, which is the side on which the introduction of the clothes hangers 9 takes place. The flap 2 lies on the bevel 3 in the closed position. The bevel 3 extends in such a manner that its lowest point is at the flap 2 and its highest point is at the front end of the base body 1. The point at which the flap 2 lies on the bevel 3 is lower than its pivot point. This bevel 3 is formed by three partial bevels 3a, 3b, 3c, arranged one behind the other. As shown in FIGS. 3 and 5, the individual bevels 3a, 3b and 3c have different widths at their corresponding upper sides 4a, 4b and 4c (FIG. 5). The rear (first) bevel 3a is associated with the flap 2 and over its entire length La (FIG. 3) it has the maximum possible width permitted by the wall thickness B1 (FIG. 5). The width of the top of the second bevel 3b decreases with the distance from the flap 2. In the embodiment, the wall thickness B1 is reduced by the presence of a fourth bevel 19 formed in the side wall 26, extending in an inward, forward and downward (and thus transverse) direction at an angle of about 45° to the base body 1. (See FIGS. 2 and 5. This bevel 19, like the bevels 3a, 3b and 3c, can be produced by milling or else by injection molding when the hanging device is manufactured.

Figure 6:
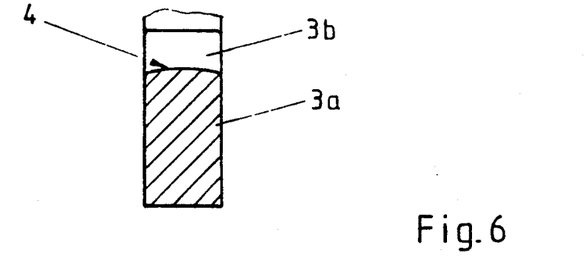
FIG. 6 is a partial section through the base body, taken along the line B—B.
Figure 7:
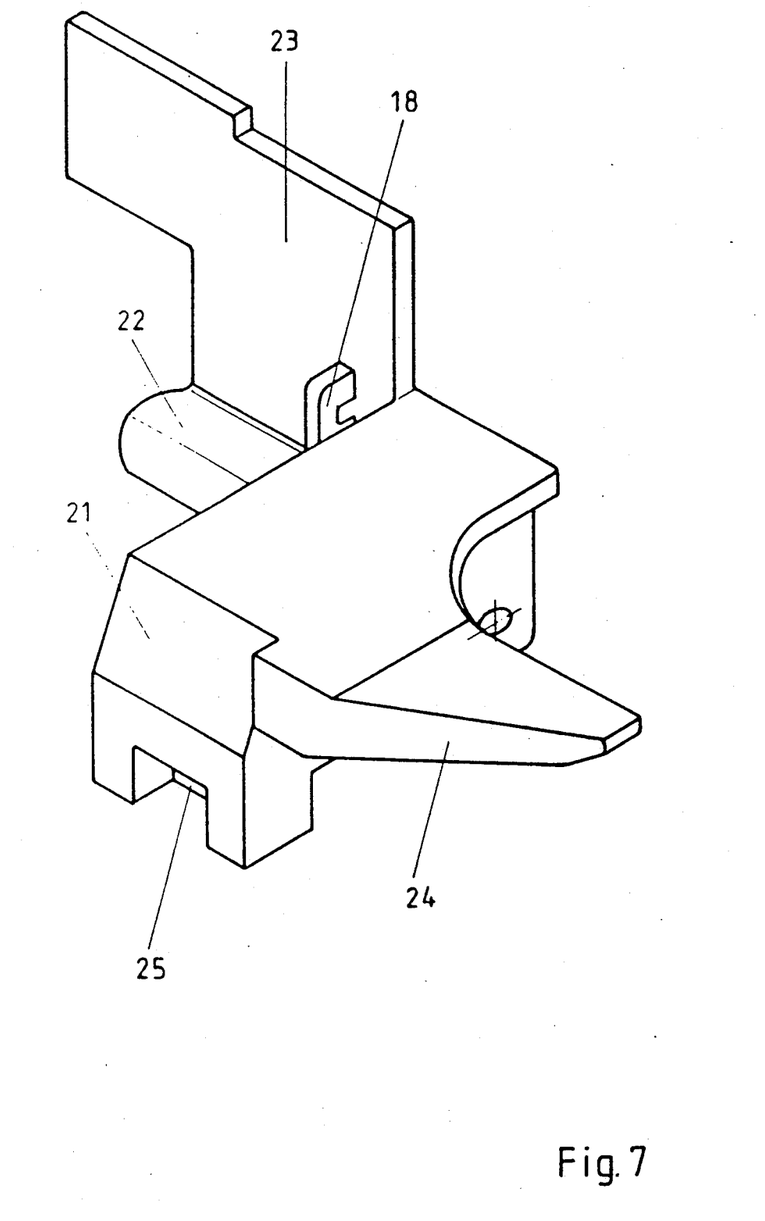
FIG. 7 shows the flap by itself, in perspective.

The first bevel 3a has, as seen in cross-section, a curved top surface 4a (FIG. 6). The transition from the first bevel 3a to the second bevel 3b is at a shoulder 5. The height H of the shoulder 5 approximates at least the diameter d of the wire of the clothes-hanger hook which is to be hung up. This assures that the received clothes hanger cannot be shoved out of the hanging device by a force acting on it in the direction of transport T.

The individual bevels 3a, 3b, 3c which are formed from back to front in the longitudinal direction have different pitches, the respective amounts of the pitch with respect to the horizontal, i.e. angles $\alpha 1$, $\alpha 2$, $\alpha 3$, decreasing with the distance of the individual bevels 3a, 3b, 3c from the flap 2. It has been found advantageous for the angle 1, to be approximately 30°, the angle $\alpha 2$, approximately 20°, and the angle $\alpha 3$, approximately 0°.

The total length L of the bevel 3 is large enough that it exceeds the diameter D of a standard clothes-hanger hook 10, or any specific clothes-hanger hook 10 to be received. In this way, the result is obtained that in the event that the hanger 9 should twist during transport by the conveyor, the hook 10 is automatically prevented from lifting out of the hanging device.

The flap 2, which in its closed position lies on the lowest (first) individual bevel 3a, is preferably formed as a single-piece plastic part and comprises a blocking body 21 which extends essentially in the longitudinal direction; and a rotary body 22 which extends at a right angle to it and adjoins the rear end of the blocking body 21. The rotary body 22 has a hole 20 which serves to receive the bolt 14 and thus to fasten the flap 2 on the base body 1.

Figure 8:
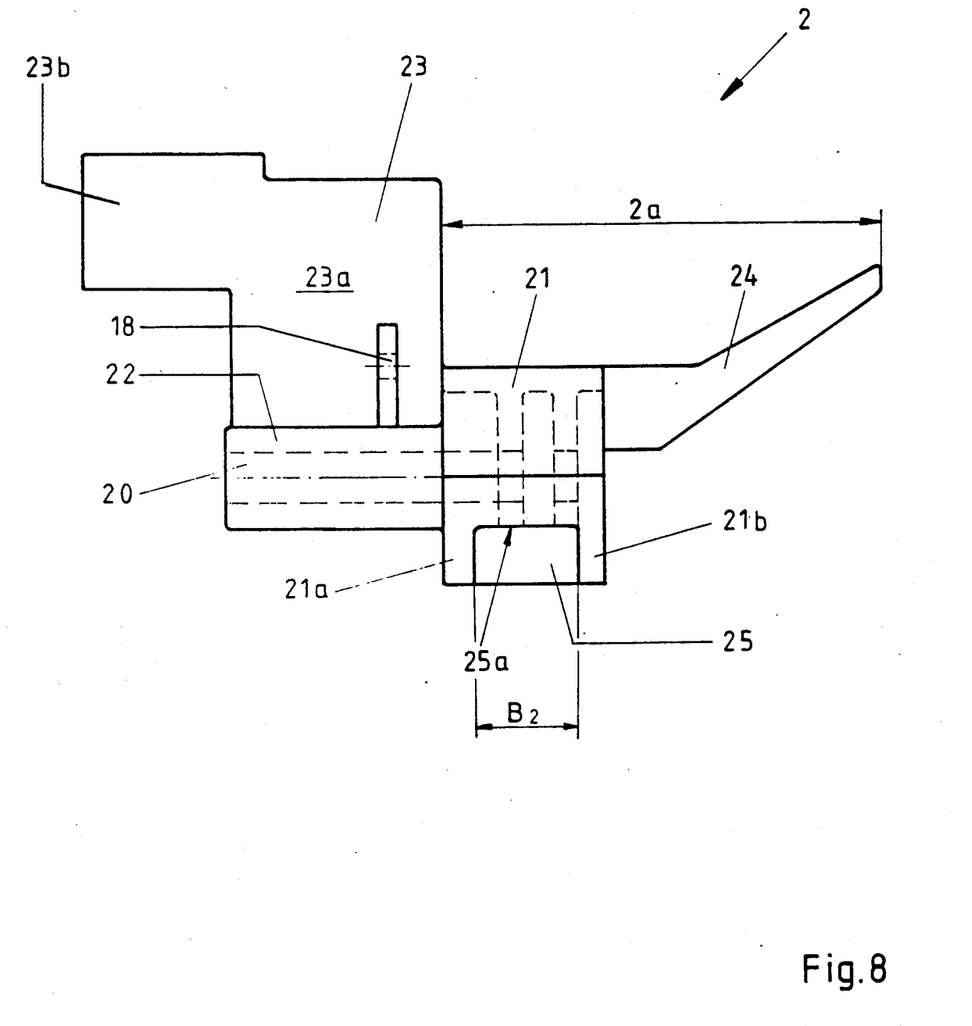
FIG. 8 is a front end view of the flap corresponding to the view in FIG. 2.

Adjoining the rotary body 22 is a substantially upwardly extending thin-walled wing 23 which, in the closed position, has its front side 23a against the rear wall 30 of the base body 1. The upper end 23b of the wing 23 is L-shaped and extends toward the outside and beyond the rear wall 30 of the base body 1. On the side of the blocking body 21 facing the loading side toward the right in FIG. 8), adjoining its upper end, there is a wing 24 which extends substantially in the width-wise direction. The wing 24 extends horizontally for about ⅓ of its length away from the blocking body 21, and then bends upward at an angle of about 40°. The total width 2a of the blocking body 21 and wing 24 (FIG. 8) is preferably greater than the diameter D of the clothes-hanger hook 10 which is to be received.

On the front of the blocking body 21 there is provided a rectangular recess 25 having a width B2 which is somewhat greater than the width B1 of the first bevel 3a on the base body 1 (FIG. 5). The flap has a surface 25a (FIG. 8) formed by the recess 25 which rests in the closed position against the first bevel 3a, and has the side surfaces 21a, 21b extending on both sides over the first bevel 3a and along the inside and outside faces of the side wall 26 of the base body 1.

The depth of the recess 25 is so selected that when it swings down, the flap does not strike against the end 31 of the bevel 3.

The lug 18 in which the tension spring 15 is suspended on the flap is formed on the wing 23. The wing 23 cooperates with an impact device provided on the conveyor (not shown). The hanging device is moved past that impact device, and the wing 23 engages the impact device, and the flap 2 swings back to place the hanging device in its open position.

Approximately at the center of the longitudinal side wall 26, at the end of the first bevel 3a, the side wall 26 is interrupted by a vertical slot 27 (FIG. 5). The slot 27 extends over the complete width of the bottom 12 of the base body 1 (from top to bottom in FIG. 5) and its width is approximately two to three times the diameter (d) of the wire material of the hook 10 (from left to right in FIG. 5). A recess 13 is formed by the slot 27 in the bottom 12. This recess 13 is widened in a direction parallel to the first bevel 3a in the direction of transport T to such an extent that the recess 13 is approximately square. In this way, it is assured that the clothes-hanger hook 10 falls freely out of the hanging device.

Figure 2A:
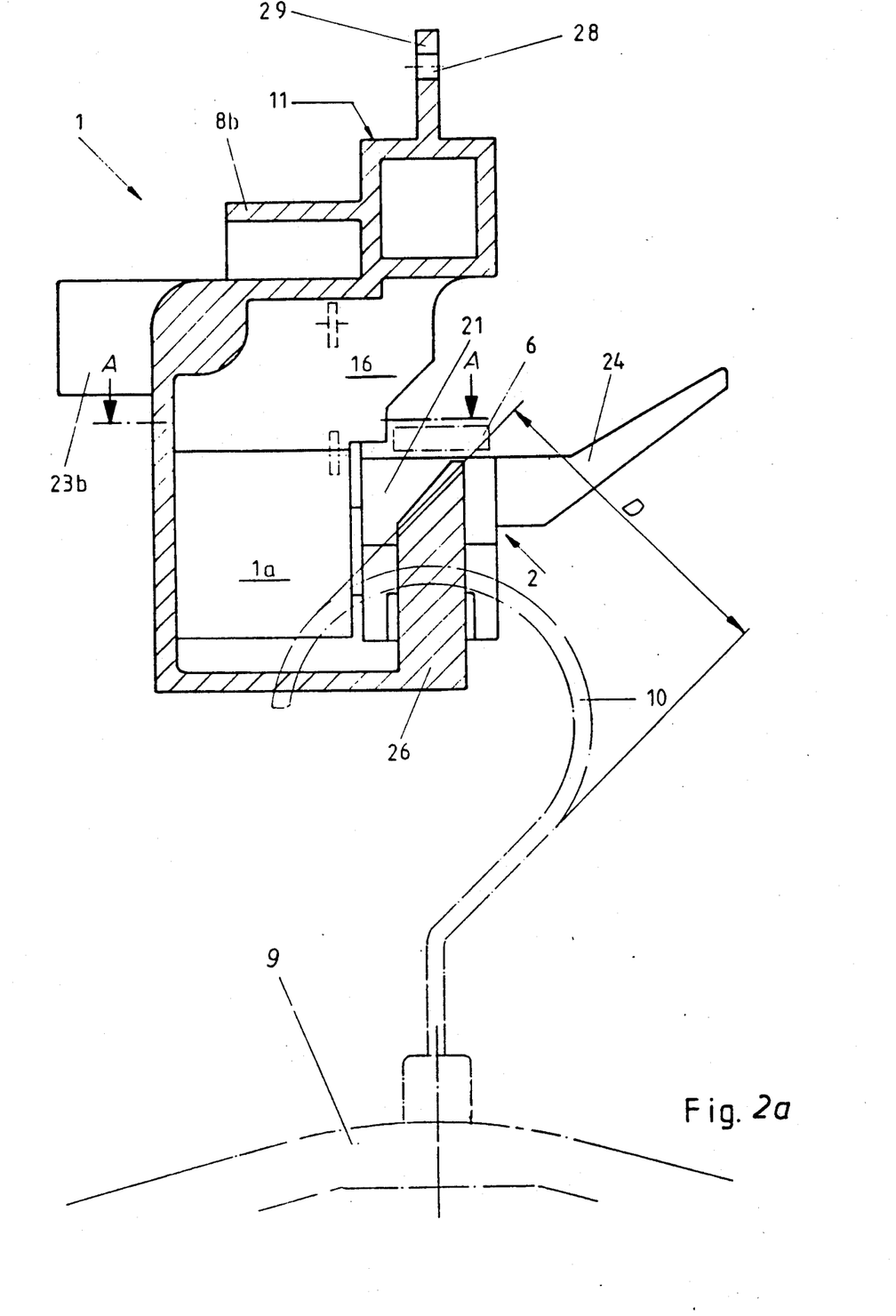
FIG. 2a is a view similar to FIG. 2, but with the hanger in its final rest position.

Also, as shown in FIG. 2a, the hook 10 can enter the recess 13 when the hanger is hanging in its rest position in the device. This prevents the hanger from tilting when it is in the hanging device, as well as preventing it from remaining hanging in the conveyor.

For these same purposes, furthermore, the wall 16 (FIGS. 2 and 3) provided at the rear end of the first bevel 3a in the cross-section of the base body 1 is spaced away rearward and downward from the first bevel 3a, and also, over about the lower half of its height, its edge runs diagonally away from the side wall 26, at an angle of about 45°.

A cam surface 8 is arranged on the top 7 of the base body 1 alongside of the flange 11. This cam surface 8 cooperates with the lever of an individualizing device (not shown) associated with the conveyor, for loading hangers on the hanging devices being carried on the conveyor. This lever (not shown here in detail) is raised by the cam surface 8, which opens a barrier in the individualizing device to release an individual hanger 9 to be loaded onto the hanging device. The released hanger then slides down over an obliquely downwardly extending rail which terminates at its exit end in a mandrel 6 (FIG. 2) which extends parallel to the hanging conveyor, from which the hanger is then automatically taken up by the hanging device.

Figure 4:
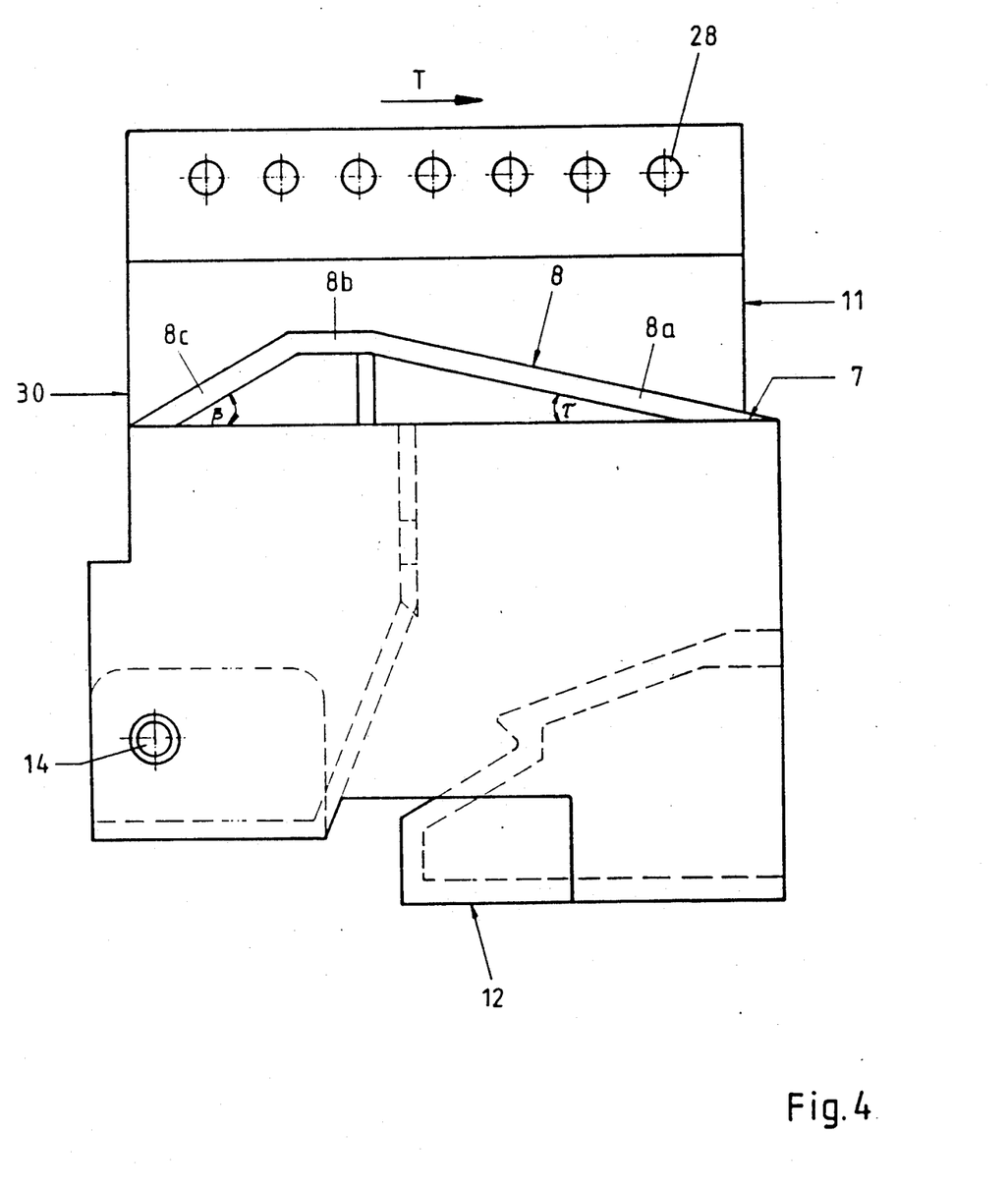
FIG. 4 is a view showing a second side of the base body.

The cam surface 8 (FIG. 4) is formed by several oblique planes 8a, 8b, 8c, arranged one behind the other. The first plane 8a in the transport direction T is ascendant, i.e., a roller on the lever of the individualizing device is lifted by its action, which opens the individualizing device. The third plane 8c is descendent, whereby the lever is moved back by its action into its original position, which closes the individualizing device. In this connection, the angle $\tau$ formed between the first plane 8a and the surface 7 is smaller than the angle $\beta$ formed by the third plane 8c and the surface 7. It has been found advantageous if $\tau$=approx. 0.5 $\beta$. In the embodiment shown by way of example, the second plane 8b is horizontal, which has the advantage providing longer control (switch) times for the individualizing device, in that the individualizing device remains open while the roller on its lever is traveling over the horizontal section 8b.

The hanging device is fastened on the carrier device (not shown) via the flange 11 which is formed on the top 7 of the base body 1. For this purpose, a narrow web 29 is formed on the shoulder 11 over its entire length, a plurality of holes 28 being provided therein at regular distances apart. By means of this web 29, the hanging device is introduced into the correspondingly structured carrier device and screwed tight, for example. Because there are a plurality of holes, it is possible to vary the relative position of the hanging device and carrier device. In known manner, the carrier device is connected to the transport chain of the conveyor. With the features of the invention, it is possible to compensate for any tolerances that may have arisen in the manufacture of the chain, so that the individual hanging devices always have a well-defined distance from each other within a conveyor. This is of great importance, in particular, for the automatic control of the loading and unloading of the clothes hangers.

The manner of operation of the hanging device of the invention will now be described. The clothes hanger 9 which is to be transferred to the hanging device hangs on a loading mandrel 6 which extends parallel to the direction of transport T. The hanging device is moved so that the loading mandrel 6 passes a slight distance above the flap 2. As shown in FIG. 2, the loading mandrel 6 is enclosed between the base body 1 and the wing 24 which is formed on the flap 2.

When the hanging device has been moved far enough along and below the loading mandrel 6, the hook 10 of the clothes hanger 9 strikes against the wall 16 which is included within the cross-section of the base body 1 and against the wing 24 of the flap 2 located at the same height and, upon further transport, is stripped off of the loading mandrel 6 and drops onto the first or second bevel 3a or 3b, on which it may slide down until it comes to rest against the flap 2 on the blocking body 21. Since the point of rest of the clothes-hanger hook 10 is lower than the pivot point of the flap 2 formed by the bolt 14 (see FIG. 3), if any force acts on the clothes hanger 9 in a direction opposite the transport direction T, a moment which is directed in counterclockwise direction will be applied to the flap 2, as a result of which the flap 2 is pressed more strongly against the first bevel 3a and the closure force increases. By means of the loading mandrel 6 which is present above the flap 2 during the loading of the clothes hanger, the flap 2 is prevented from unintentionally opening since it would immediately strike against the loading mandrel 6. Improper loading is thereby effectively prevented.

When the article of clothing (not shown) which is hanging on the clothes hanger 9 has arrived at the intended place of delivery, a correspondingly provided impact device strikes against the upper end 23b formed extending laterally beyond the base body 1 on the wing 23 of the flap 2. This swings the flap 2 backward as the hanging device is transported further. As this occurs, the opening movement of the blocking body 21 is directed, initially, in the direction of transport T, since the opening movement is clockwise, starting from below the horizontal, as shown in FIG. 3. This has the result that the clothes-hanger hook 10 which lies in front of the blocking body 21 is pushed upward a short distance on the first bevel 3a and then, when the flap 2 has opened sufficiently wide, slides down the first bevel 3a and drops out of the hanging device.

Because the blocking body 21 pushes the clothes hanger 9 upward for a small distance before it leaves the hanging device, the hanger 9 is placed in a precise, controlled position, whereby a dependable manner of operation is assured under all conditions. Thus, for instance, there is no possibility of a very light clothes hanger becoming stuck in the device as a result of static electricity, or catching on a surface which is not absolutely flat. Since the slot 27 extends over the complete width of the base body 1 and this slot furthermore widens to form an approximately square recess 13, the hook of the clothes-hanger will pass freely from the hanging device and it is not possible for a clothes-hanger hook to tilt upon delivery from the hanging device.

Although an illustrative embodiment of the invention has been described, it is to be understood that the appended claims are not limited to such embodiment, but rather are to be construed to cover all modifications and variations which fairly fall within the scope of the teachings herein.

What is claimed is:

1. A hanging device for supporting a clothes hanger on a suspended conveyor which moves in a direction of transport (T), comprising:

a base body; a flap which is pivotally mounted on the base body for pivoting about an axis transverse to the direction of transport; the flap having an open position and a closed position; and means for locating the hook of the clothes hanger for being substantially fully supported on a sloping portion of the base body such that gravity holds the hook resting against a portion of the flap alongside said hook, with respect to said direction on transport (T) and not substantially underneath said hook, so as to maintain said hook substantially fully supported on said resting position of the base body, with the flap in its closed position.

2. A hanging device according to claim 1, wherein the base body and the flap are substantially made of plastic.

3. A hanging device according to claim 1, further comprising means for varying the relative position of the base body with respect to the suspended conveyor upon which the hanging device is hung.

4. A hanging device according to claim 3, wherein said position-varying means comprises a projection formed on the base body, a plurality of bore holes being arranged alongside each other horizontally in said projection.

5. A hanging device for supporting a clothes hanger on a suspended conveyor which moves in a direction of transport (T), comprising:

a base body; a flap which is pivotally mounted on the base body for pivoting about an axis transverse to the direction of transport; the flap having an open position and a closed position; and means for locating the hook of the clothes hanger on a portion of the base body and resting against a portion of the flap so as to maintain said hook on said resting portion of the base body, with the flap in its closed position;

further comprising means for causing the flap to open with an initial movement in the direction of transport, of said portion of the flap against which said hook is resting.

6. A hanging device according to claim 5, wherein the pivot axis of the flap lies at a higher plane than its point of rest rear the bevel formed on the base body.

7. A hanging device according to claim 5, further comprising spring means for applying a force to resist the opening of the flap.

8. A hanging device for supporting a clothes hanger on a suspended conveyor which moves in a direction of transport (T), comprising:

a base body; a flap which is pivotally mounted on the base body for pivoting about an axis transverse to the direction of transport; the flap having an open position and a closed position; and means for locating the hook of the clothes hanger on a portion of the base body and resting against a portion of the flap so as to maintain said hook on said resting portion of the base body, with the flap in its closed position;

wherein the resting portion of the base body on which the hook of the clothes hanger rests, when the flap is in the closed position, is a bevel formed on the base body in front of the flap in the direction of transport (T), and the flap also rests near this bevel in its closed position.

9. A hanging device according to claim 8, wherein an upward-facing surface of the bevel is rounded.

10. A hanging device according to claim 8, wherein the bevel is formed by a plurality of individual bevels arranged one behind the other in the direction of transport, each having a pitch with respect to the horizontal, and the pitch of the individual bevels decreases as a function of the distance between a given individual bevel and the flap.

11. A hanging device according to claim 10, wherein an upward-facing surface of at least one of the individual bevels becomes wider as the distance to the flap decreases.

12. A hanging device according to claim 8, wherein the length (L) of the bevel is greater than the diameter (D) of the hook of the hanger which is to be received.

13. In combination, a hanging device according to claim 12, and further comprising a hanger having a hook with a predetermined diameter (D), said hook resting on the bevel.

14. A hanging device according to claim 10, wherein first and second ones of said plurality of individual bevels lying closest to the flap are separated by a shoulder having a height (H) which corresponds substantially at least to the diameter (d) of the wire of the clothes-hanger hook to be held on said bevels.

15. In combination, a hanging device according to claim 14, and further comprising a hanger having a hook made of wire with a predetermined diameter (d) resting on said first bevel.

16. A hanging device for supporting a clothes hanger on a suspended conveyor which moves in a direction of transport (T), comprising:
a base body; a flap which is pivotally mounted on the base body for pivoting about an axis transverse to the direction of transport; the flap having an open position and a closed position; and means for locating the hook of the clothes hanger on a portion of the base body and resting against a portion of the flap so as to maintain said hook on said resting portion of the base body, with the flap in its closed position;
wherein the widths of a forward-facing region of the flap, which region extends transverse to the direction of transport, where the flap engages the clothes-hanger hook, is greater than the diameter (D) of the clothes hanger hook to be engaged.

17. In combination, a hanging device according to claim 16, and further comprising a hanger having a hook with a predetermined diameter (D), said hook engaging said forward-facing region of the flap.

18. A hanging device for supporting a clothes hanger on a suspended conveyor which moves in a direction of transport (T), comprising:
a base body; a flap which is pivotally mounted on the base body for pivoting about an axis transverse to the direction of transport; the flap having an open position and a closed position; and means for locating the hook of the clothes hanger on a portion of the base body and resting against a portion of the flap so as to maintain said hook on said resting portion of the base body, with the flap in its closed position;
wherein the flap extends perpendicular to the transport direction (T) beyond the base body on both sides.

19. A hanging device for supporting a clothes hanger on a suspended conveyor which moves in a direction of transport (T), comprising:
a base body; a flap which is pivotally mounted on the base body for pivoting about an axis transverse to the direction of transport; the flap having an open position and a closed position; and means for locating the hook of the clothes hanger on a portion of the base body and resting against a portion of the flap so as maintain said hook on said resting portion of the base body, with the flap in its closed position;
wherein the base body is formed by a rectangular profile of varying wall thickness, which defines a loading side which is open, and which is open at its front end facing the direction of transport (T), and which is partially closed toward the loading side to the extent of more than one-half its height, and is substantially open on the loading side toward the rear, near said flap.

20. A hanging device for supporting a clothes hanger on a suspended conveyor which moves in a direction of transport (T), comprising:
a base body; a flap which is pivotally mounted on the base body for pivoting about an axis transverse to the direction of transport; the flap having an open position and a closed position; and means for locating the hook of the clothes hanger on a portion of the base body and resting against a portion of the flap so as to maintain said hook on said resting portion of the base body, with the flap in its closed position;
wherein a cam surface is formed on part of the base body for engaging and actuating a loading device to load a clothes hanger on the hanging device.

21. A hanging device according to claim 20, wherein the cam surface can raise and then lower a lever of such loading device, being formed by several oblique planes arranged one behind the other, the angle ($\tau$) enclosed by the first of said several planes and the base body being smaller than the angle ($\beta$) enclosed by the last of said several planes and the base body so that said first plane moves such lever more gradually than said last plane.

22. A hanging device for supporting a clothes hanger on a suspended conveyor which moves in a direction of transport (T), comprising:
a base body; a flap which is pivotally mounted on the base body for pivoting about an axis transverse to the direction of transport; the flap having an open position and a closed position; and means for locating the hook of the clothes hanger on a portion of the base body and resting against a portion of the flap so as to maintain said hook on said resting portion of the base body, with the flap in its closed position;
wherein the base body is provided on its bottom with a recess which extends over the entire width, and when said flap is in its closed position, said recess is partially bounded by the flap.

23. A hanging device for supporting a clothes hanger on a suspended conveyor which moves in a direction of transport (T), comprising:
a base body; a flap which is pivotally mounted on the base body for pivoting about an axis perpendicular to the direction of transport; the flap having an open position and a closed position; and means for locating the hook of the clothes hanger on a portion of the base body and resting against a portion of the flap so as to maintain said hook on said resting portion of the base body, with the flap in its closed position;
wherein the resting portion of the base body on which the hook of the clothes hanger rests, when the flap is in the closed position, is a bevel formed on the base body in front of the flap in the direction of transport (T), and the flap also rests near this bevel in its closed position;
wherein the base body is provided on its bottom with a recess which extends over the entire width and when said flap is in its closed position, said recess is partially bounded by the flap; and
wherein, when said flap moves into its open position, such hanger is released so as to descend from said bevel and to exit from said hanging device through said recess.

24. A hanging device according to claim 23,
wherein the pivot axis of the flap lies at a higher plane than its point of rest near the bevel formed on the base body; and
wherein the flap opens with an initial movement in the direction of transport, of said portion of the flap against which said hook is resting.

* * * * *